(12) United States Patent
Linke et al.

(10) Patent No.: US 12,400,627 B2
(45) Date of Patent: Aug. 26, 2025

(54) SOUND REDUCER, METHOD OF MAKING SAME, AND FLUID CONDUIT SYSTEM INCLUDING SUCH A SOUND REDUCER

(71) Applicant: Umfotec GmbH, Northeim (DE)

(72) Inventors: Berend Linke, Noerten-Hardenberg (DE); Ralf Buck, Kipfenberg/Schelldorf (DE); Viktor Hurlebaus, Northeim (DE)

(73) Assignee: Umfotec GmbH, Northeim (DE)

( * ) Notice: Subject to any disclaimer, the term of this patent is extended or adjusted under 35 U.S.C. 154(b) by 388 days.

(21) Appl. No.: 17/824,057

(22) Filed: May 25, 2022

(65) Prior Publication Data

US 2022/0383844 A1   Dec. 1, 2022

(30) Foreign Application Priority Data

May 26, 2021 (DE) ...................... 10 2021 113 611.3

(51) Int. Cl.
*G10K 11/16* (2006.01)
*B60H 1/00* (2006.01)
(Continued)

(52) U.S. Cl.
CPC ............ *G10K 11/161* (2013.01); *F01N 1/023* (2013.01); *B60H 2001/006* (2013.01); *G10K 11/172* (2013.01)

(58) Field of Classification Search
CPC ............ F01N 13/1888; F01N 13/1894; F01N 2470/02; F01N 2470/18; F01N 1/089;
(Continued)

(56) References Cited

U.S. PATENT DOCUMENTS 2,041,767 A * 5/1936 Jack .................. F02M 35/1255
181/248
5,036,585 A * 8/1991 Schweinfurth ..... F01N 13/1838
181/282
(Continued)

FOREIGN PATENT DOCUMENTS

CN   109278491 A  *  1/2019
CN   109532389 A  *  3/2019 ......... B60H 1/00507
(Continued)

OTHER PUBLICATIONS

English translation of KR 20140112752 A, accessed Oct. 4, 2024 via Espacenet, <https://translationportal.epo.org/emtp/translate/?ACTION=description-retrieval&COUNTRY=KR&ENGINE=google&FORMAT=docdb&KIND=A&LOCALE=en_EP&NUMBER=20140112752&SRCLANG=ko&TRGLANG=en> (Year: 2014).*
(Continued)

*Primary Examiner* — Jeremy A Luks
(74) *Attorney, Agent, or Firm* — Gerald E. Hespos; Michael J. Porco

(57) ABSTRACT

A sound reducer (10) has a housing (14) with a housing wall bounding an interior space (141). The housing wall has a mantle (142) extending longitudinally along a housing axis. Two end walls (143) are transverse to the housing axis. A main tube (12) extends through the interior space (141) and has a first and second ends (121). Windows (22) are formed as tube wall openings within the interior space (141). The first end (121) of the main tube (12) is fixed at a first passage (18a) through the housing wall, and the second end (122) of the main tube (12) is fixed at a second passage (18b) through the housing wall. At least the second passage (18b) passes eccentrically through one of the end walls (143). The main tube (12) is curved in a main plane and the first passage (18a) passes through the mantle (142).

19 Claims, 3 Drawing Sheets

(51) Int. Cl.
*F01N 1/02* (2006.01)
*G10K 11/172* (2006.01)

(58) Field of Classification Search
CPC .. F01N 13/1861; F01N 2490/08; F01N 1/006; F04B 39/0061; B60H 2001/006
USPC ........................................................ 181/282
See application file for complete search history.

(56) References Cited

U.S. PATENT DOCUMENTS

| | | | | |
|---|---|---|---|---|
| 5,101,931 | A * | 4/1992 | Blass | F04B 39/0055 181/240 |
| 5,196,654 | A * | 3/1993 | DiFlora | F01N 1/089 181/255 |
| 6,425,742 | B1 | 7/2002 | Fukuda et al. | |
| 8,051,949 | B2 * | 11/2011 | Henke | F01N 1/08 181/251 |
| 8,684,131 | B1 * | 4/2014 | Park | F01N 1/04 181/239 |
| 2009/0090579 | A1 * | 4/2009 | Nishida | F04B 53/001 181/255 |
| 2011/0272209 | A1 * | 11/2011 | Tauschek | F01N 1/08 181/228 |
| 2015/0047922 | A1 * | 2/2015 | Vollmer | F01N 1/24 181/264 |
| 2016/0245140 | A1 * | 8/2016 | Boriga | F01N 1/006 |
| 2019/0178124 | A1 * | 6/2019 | Ostromecki | F01N 1/083 |

FOREIGN PATENT DOCUMENTS

| | | | | |
|---|---|---|---|---|
| DE | 102005005865 | | 8/2006 | |
| DE | 102010015322 | A1 * | 10/2011 | ............ F01N 1/006 |
| DE | 102010052468 | A1 * | 5/2012 | ............ F01N 1/026 |
| DE | 102018101380 | | 7/2019 | |
| KR | 20140112752 | A * | 9/2014 | |

OTHER PUBLICATIONS

English translation of CN 109278491 A, accessed Oct. 4, 2024 via Espacenet, <https://translationportal.epo.org/emtp/translate/?ACTION=description-retrieval&COUNTRY=CN&ENGINE=google&FORMAT=docdb&KIND=A&LOCALE=en_EP&NUMBER=109278491&SRCLANG=zh&TRGLANG=en> (Year: 2019).*
English translation for DE10210052468A1, accessed Feb. 18, 2025 via Espacenet (Year: 2012).*
German Office Action dated Jan. 24, 2022.

* cited by examiner

FIG. 4A
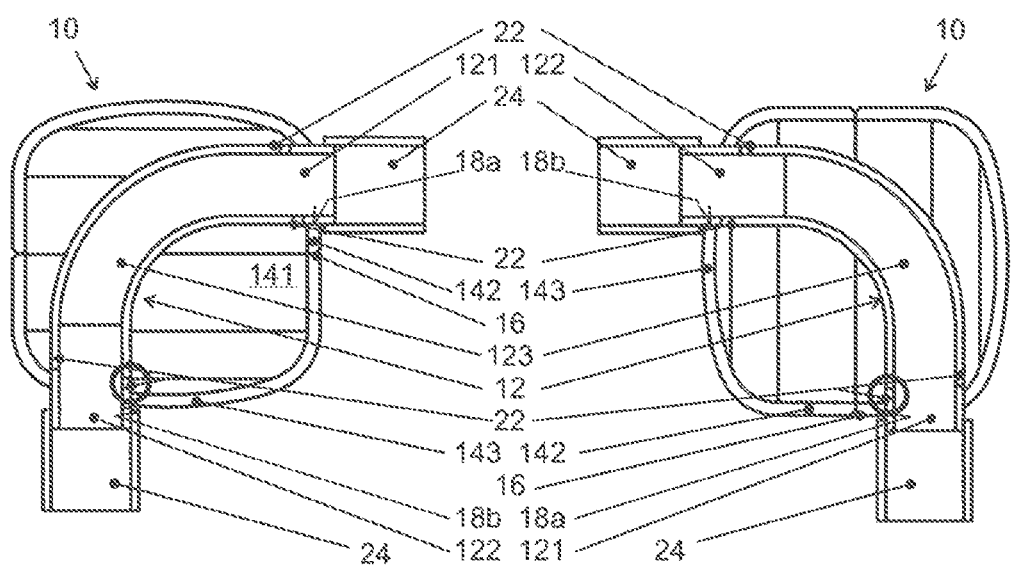
FIG. 4B
FIG. 4C
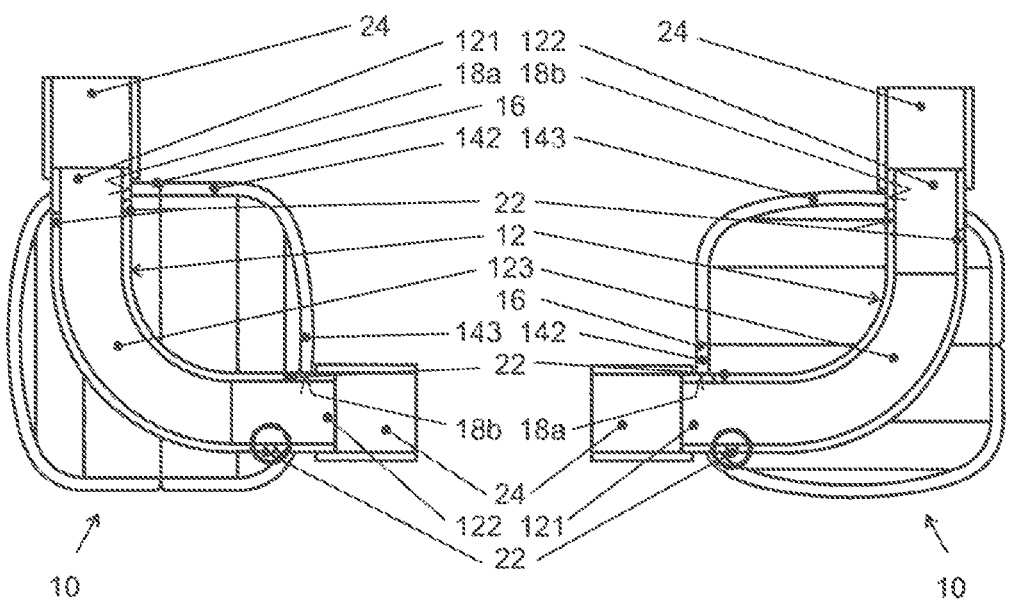
FIG. 4D

SOUND REDUCER, METHOD OF MAKING SAME, AND FLUID CONDUIT SYSTEM INCLUDING SUCH A SOUND REDUCER

FIELD OF INVENTION

The invention relates to a sound reducer, a method of manufacturing a sound reducer, and a fluid conduit system within which such a sound reducer can be traversed by a gaseous fluid, where the system includes the sound reducer as well as connecting tubes fluid-tightly connected to the ends of its main tube.

RELATED ART

Generic sound reducers are described in the as yet unpublished German patent application DE 10 2020 130 205.3.

Sound reducers are known for a variety of purposes and are based on different operating principles. The sound reducer described in the above-mentioned application, like the sound reducer of the invention, essentially operates on the principle of a Helmholtz resonator. A possible field of application of such sound-reducing resonators is in the area of exhaust gas lines of motor vehicles as well as in the area of refrigerant circuits and air-conditioning systems, such as those of motor vehicles. The fluid, e. g. exhaust gas or gaseous refrigerant flows through a main tube that passes through a resonator housing having two passages and being otherwise fluid-tight. Depending on the embodiment, the passages of the housing are connected, in particular welded or crimped, in a sealing manner to the main tube or to connecting tubes on the fluid circuit side, which, in turn, are connected to the main tube. The main tube has tube wall openings in the interior space of the housing. These tube wall openings are referred to hereinafter as windows and typically are in the form of slots or bores. The windows place the interior space of the main tube in fluid-conducting communication with the interior space of the housing. The shape and position of the windows, together with the size of the resonator chamber formed by the housing, determine which frequencies of sound conducted by the fluid or generated in the fluid will be reduced by the Helmholtz effect in the sound reducer. The known housing is of the pressure vessel type with a substantially cylindrical mantle and end walls that are convex when viewed from the outside or concave when viewed from the interior of the housing. Such a resonator housing in the prior art and also in the context of the present invention is designed for high internal pressures and is particularly suitable for refrigerant circuits of air-conditioning systems, where pressures of up to 35 bar can occur in the refrigerant that is at least partially in gaseous form, for example in the pressure section downstream of the compressor. Such a housing shape is also favorable in terms of production.

In the known sound reducer, the main tube, which is designed as a straight tube section, passes through the housing off-center, parallel to the housing axis. This results in the main tube running very close to the inner surface of the housing on one side. This side of the main tube or of the housing is at the bottom in the final assembly state of the sound reducer, so that any liquid introduced into the resonator chamber with the fluid, for example oil for compressor lubrication mixed to the refrigerant of an air conditioning system, settles at this narrow point. At least one of the windows of the main tube, which is to be referred to here as the suction window and is designed in particular in the form of a comparatively small bore (but can also be different, e. g. slot-shaped), is arranged at the lowest apex line of the main tube, i. e. in the region of the narrowest distance between the main tube and the inner wall of the mantle. During operation, the gaseous fluid flows through the main tube at a not inconsiderable velocity, whereas the gas in the interior of the resonator chamber is essentially stationary outside the main tube. This results in a pressure gradient across the suction window, so that fluid accumulated at the narrow point between the main tube and the inner surface of the mantle is sucked into the main tube and out of the resonator chamber by the so-called Bernoulli effect. Consequently, the volume of the resonator chamber does not decrease due to liquid accumulated over time, so that there is no deterioration of the sound reduction effect or a shift in the mainly attenuated frequencies, even over long periods of operation.

However, a problem with the known arrangement is the large axial installation space required to install such a sound reducer in an existing piping system. In addition to the actual length of the housing, the connections to the connecting tubes also require space. Motor vehicles have virtually no axially long free spaces for comfort devices, such as the sound reducer in question, over which tube sections that can be replaced by such a sound reducer extend in a straight alignment. The sound reducers in question are therefore often installed in corner areas of fluid line systems where two connecting tubes meet, e. g. at an angle of 90°. In this case, the main tube is connected on the inlet side, for example, in a straight extension to one of the connecting tubes. On the outlet side, however, a suitably curved connecting tube must be used. This also requires a lot of space, is technically tricky, especially in the pressure section, and is complicated to install.

An object of the invention to provide an improved sound reducer that is more suitable for installation in corner areas of fluid line systems with lower installation space requirements, and to provide a corresponding fluid line system, as well as a particularly favorable manufacturing process for such a sound reducer.

SUMMARY OF THE INVENTION

One aspect of the invention relates to a sound reducer where the main tube is curved in a main plane and the first passage passes through the mantle. Another aspect of the invention relates to a fluid conduit system that has a sound reducer as described above along with connecting tubes fluid-tightly connected to the ends of the main tube of the sound reducer's main tube. A further aspect of the invention relates to a manufacturing process for the above-described sound reducer.

The sound reducer of the invention has a main tube with a shape required for optimum, i. e. most space-efficient, connection to two connecting tubes of a fluid line system that are at an angle to each other, while at the same time producing the lowest possible pressure loss. The main tube itself defines a tube bend representing the corner area of the tube system. The main plane of the main tube or its bend is defined as the plane spanned by the axial directions of the two main tube ends and dividing the main tube in half along its entire length. The resulting corner area of the fluid conduit system is enclosed by the housing, which serves as a resonator chamber. Accordingly, the outer contour of the corner area of the fluid conduit system increases only insignificantly. In addition, a sharply bent tube return, as would be required for the connection of a known sound reducer with straight tube routing, is unnecessary in the subject invention. This idea is based on the realization by the inventors that a specific shape of the main tube is not important to realize efficient sound reduction, but rather efficient sound reduction is determined essentially only by the ratio of the size of the resonator chamber to the sizes of the windows in the main tube. The resonator chamber and the windows in the main tube can be dimensioned exactly as with a sound reducer having a straight main tube, so that the sound reducer of the invention has the same effect as the known sound reducer, but can be installed in a much more space-efficient and technically simpler manner.

In some embodiments, the housing axis lies in the main plane of the main tube and the centers of the passages are on different sides of the housing axis. This is because if one leg of the main tube coming from the end wall passage runs parallel to the housing axis and in the direct vicinity along the inner surface of the mantle and if the other leg intersects the housing axis and leads to the mantle passage, the largest possible radius is realized in the case of a simple bend by a predetermined angle of curvature. This is advantageous in terms of the resulting pressure losses and ease of manufacture.

The axial directions of the two ends of the main tube, i. e. its legs outside the bend, may be perpendicular to each other. This corresponds to the most common shape requirement resulting from the usual 90° curvature in fluid line systems. In addition, both legs of the main tube in this embodiment run essentially parallel to the orientation of the mantle wall or end wall, so that they can be guided particularly close to these walls.

In some embodiments, windows are arranged on the radially outer and radially inner apex line of the main tube—described in relation to the curvature of the main tube—adjacent to the passages and offset from one another in such a way that, in each orientation of the sound reducer with vertical alignment of one of its main tube ends, one of the windows is positioned at the lowest point of the main tube within the interior space. The person skilled in the art will recognize that this specification is to be understood in consideration of unavoidable tolerances and therefore, especially in the case of orientations with the mantle passage at the bottom, also includes those variants in which there is a slight distance between the lowest-lying window and the inner surface of the mantle. Such an advantageous design results in one window always being located in the immediate vicinity of the lowest point of the interior space in the installed state for every usual orientation of the sound reducer. Thus, liquid accumulating there is sucked off at very low accumulation levels via the Bernoulli effect explained above. Irrespective of the specific mounting position, it is therefore never possible for higher liquid levels to accumulate and thus for the resonance chamber volume to be significantly reduced. The sound reducer according to the invention is therefore largely independent of the mounting position and can be used without technical modifications in a wide range of fluid line system variants, for example in different motor vehicle models.

Various approaches are possible for integrating the sound reducer according to the invention into a fluid line system. In any case, it is considered advantageous if the ends of the main tube (at least also) engage positively in the passages. To achieve a reliable, pressure-resistant seal, the ends of the main tube also ca be connected to the walls of the passages by a material bond, in particular by welding. However, it currently appears more favorable to weld the ends of the connecting tubes to the housing. Separate welding of the main tubes to the housing can then be dispensed with in many cases.

In one embodiment, the ends of the main tube extend through the passages. This means that the connection points at which the connecting tubes of the fluid conduit system are connected to the ends of the main tube are located outside the housing. They are thus particularly easy to reach for tools, for example a welding lance. On the other hand, the connecting tubes protruding from the housing require additional installation space. Alternatively, the main tube can terminate flush with the outer end of the passage or can project only into the axially inner section of the passage, leaving an outer axial section of the passage into which the main tube does not project and into which the connection tube can be pushed—preferably positively—and then, to achieve the required tightness, connected to the housing by a material bond. Of course, this variant is only suitable for comparatively thick housing walls or a corresponding local wall thickening.

Alternatively, it can be provided that the main tube is (at least also) positively fit into the contour of the interior space so that the edges of the two ends of the main tube lie flush against the edges of the passages. This fixes the position of the main tube in the housing without requiring engagement of the main tube ends in the passages. Such a design permits a particularly thin-walled construction of the housing. For contour adaptation in this embodiment, it can be provided that In some embodiments, the edges of the two ends of the main tube are corrugated to adapt to the curvatures of the inner surfaces of the housing and end walls and. Thus, the main tube passes through the interior space otherwise without contact. The positive-locking fixation of the main tube within the housing may be realized solely by the tube ends abutting the inner wall of the housing in the transition area between the mantle and end walls. An additional fixation inside the housing is not required, thereby avoiding a corresponding reduction of the resonance chamber volume. One or more partition walls may divide the resonance chamber into different subchamber. These partition walls may have corresponding passages for the main tube and can be used as additional positioning supports.

The housing may have two interconnected material-bonded, i.e. welded, axial half-shells. A first half-shell may carry the first passage and the second half shell may carry the second passage. These half-shells advantageously are identical in shape, apart from the position of their passages. This allows a particularly economical production, with a single tool being used to produce all required housing parts. Deep drawing or cold forming of the half-shells has proved to be a suitable manufacturing technique. The essentially identical shape of the half-shells means that the costs of different tools can be saved and logistics can also be simplified significantly. Only the passages that subsequently are machined or punched, especially in the case of deep-drawn parts, are different in the two half-shells of each pair required for a housing. In the first half-shell, the passage is inserted in the mantle, whereas in the second half-shell it is inserted in its end wall.

Some embodiments have a lightweight material-saving housing that enables precisely inserted passages by drilling or punching. One embodiment has two half-shells with outer local wall thickenings in the mantle region where the first passage is positioned in the first half-shell and also in the end wall region in which the second passage is positioned in the second half-shell. The passages may pass through the wall thickenings. In other words, the two identical half-shells are produced, for example by deep drawing, in such a way that local wall thickenings are located at those positions where one of the passages may have to be inserted later. This enables precise drilling and also provides a passage with a comparatively long axial extension to be used for stable, positive positioning of the main tube or connecting tube end.

Various approaches are conceivable for the actual fixing of the connecting tubes. For example, the connection tubes can be inserted into the ends of the main tube. In this variant, it is advantageous if the ends of the main tube have an enlarged diameter compared with the central area of the main tube, so that there is no diameter jump in the tube's interior after the connection of the connecting tube.

Alternatively, the connecting tubes can be fit onto the ends of the main tube. In this case, the ends of the connection tubes may have an enlarged diameter to avoid a diameter jump in the tube's interior. However, this design requires the ends of the main tube to protrude outward on the housing to be accessible for the push-on process.

A further alternative butt welds the connecting tubes to the ends of the main tube. In other words, the end faces of the (straight or diagonally cut) main tube and the (correspondingly cut) connecting tube sit flush on top of each other. This also requires good accessibility, i. e. the ends of the main tube should either protrude from the housing or at least project into the passage with a positive fit.

A method also is provided for making a sound reducer from two substantially identical half-shells. The method includes providing two housing half-shells, with each housing half shell comprising a mantle extending longitudinally along a shell axis with a mantle inner surface rotationally symmetrical about the shell axis and with an end wall oriented transverse to the shell axis with an associated end wall inner surface. The method then includes providing a main tube curved in a main plane and having first and second ends. The method proceeds by making a first passage in the edge region near the end wall of the mantle of a first of the two half-shells and making a second passage off-center in the end wall of the second of the two half-shells. The method then includes pre-fixing the first end of the main tube in or at the first passage. The second half-shell then is positioned on the first half-shell so that their mantle edges abut one another, the shell axes lie coaxially with respect to one another in the main plane of the main tube, and the second end of the main tube is pre-fixed in or at the second passage, with the main tube being pre-fixed overall in a form-fitting manner in the interior space. The method proceeds by material bonding of the mantle edges to each other to form the housing.

Pre-fixing of the first end of the main tube in or at the first passage of the main tube can be performed in a positive manner by inserting the first end of the main tube into the first passage in a form-fitting manner and possibly also in a slightly force-fitting manner.

The pre-fixing of the first end of the main tube in or at the first passage may comprise a positive insertion of an mounting aid mandrel into the first passage and the first end of the main tube. Particularly in cases where the form-fit pre-fixation of the main tube as a whole is not achieved by form-fit insertion of its first end into the first passage, but where the main tube is only held form-fit by both half-shells together, temporary auxiliary fixation of the main tube to the first half-shell is required to stabilize the main tube at least until the second half-shell is fit. For this purpose, the first end of the main tube can be positioned at the first passage, and a mounting aid mandrel can be inserted from the outside through the first passage and into the first end of the main tube in a form-fitting and possibly also a slightly force-fitting manner. This fixes the first end of the main tube and the first passage both to the mounting aid mandrel in a predetermined relative position to each other. This temporary auxiliary fixing is sufficient to hold the main tube in position until the second half-shell is fit and connected to the first half shell, so that the two half-shells then jointly positively fix the main tube. The auxiliary mounting pin can then be removed again to make room for the connecting tubes to be connected.

The pre-fixed ends of the main tube then can be joined to the housing with a material bond, in particular welded. This can be done as part of the manufacture of the sound reducer itself. In certain embodiments, however, it is also conceivable to carry out a material bond of the main tube to the housing as part of the process of connecting the connecting tubes. In many cases, however, it is more advantageous to connect the connecting tubes to the housing by a material bond, in particular by welding. In this case, it is often possible to dispense with a separate material connection of the main tube ends to the housing. In these cases, the main tube is held in the housing only by a form-fit and, if necessary, additionally by a force-fit (press-fit connection). In any case, the material bond connection is intended to guarantee pressure-tight fluid tightness to the outside, which is particularly required in pressure applications, such as in the context of refrigerant circuits of air-conditioning systems, especially in motor vehicles. Also due to the frequently desired pressure resistance, the inner surfaces of the end walls may be curved concavely.

Further details and advantages are shown in the following specific description and drawings.

BRIEF DESCRIPTION OF THE DRAWINGS

FIGS. 4A-4D are cross-sections through an alternative embodiment of a sound reducer according to the invention in four orientations.

DETAILED DESCRIPTION

Identical reference signs in the figures indicate identical or analogous elements.

Figure 1:
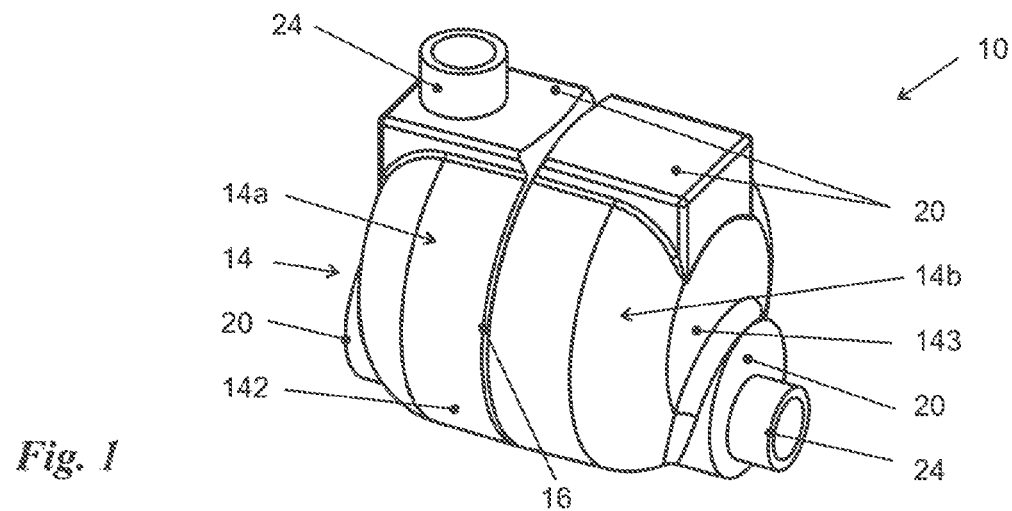
FIG. 1 is perspective view of a sound reducer according to an embodiment of the invention.
Figure 2:
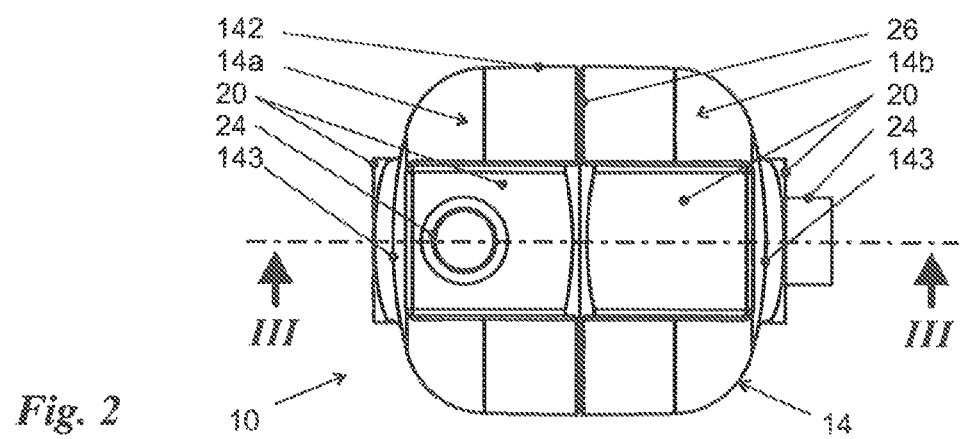
FIG. 2 is a top view of the sound reducer of FIG. 1.
Figure 3:
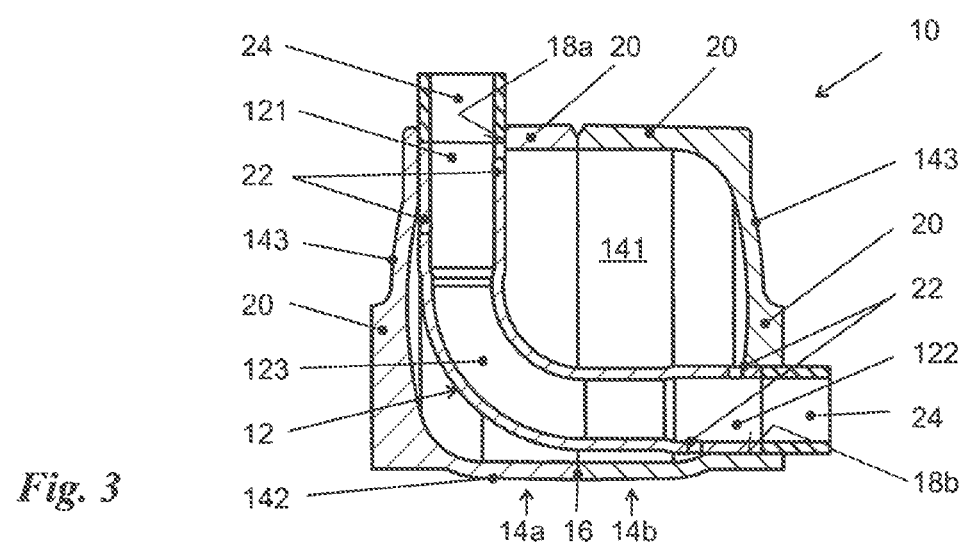
FIG. 3 is a cross-section taken along line III-III in FIG. 2.

FIGS. 1 to 3 show an embodiment of a sound reducer 10 according to the invention in different representations, namely in perspective in FIG. 1, in plan view in FIG. 2, and in section along the section line III-III of FIG. 2 in FIG. 3. These figures will first be discussed together.

The sound reducer 10 comprises a main tube 12 that is curved at an angle of 90° so that its two ends, namely its first end 121 and its second end 122, are at right angles to each other. The curvature in the central region 123 of the main tube 12 defines a main plane along which the section in FIG. 3 is guided.

The main tube 12 is enclosed by a housing 14 that, in the illustrated embodiment consists of essentially identical first and second half-shells 14a and 14b. The half-shells 14a, 14b are placed on each other with their mantle edges and are welded together along this connecting line 16. The resulting housing 14 thus encloses an interior space 141 bounded by a substantially cylindrical mantle 142 and two end walls 143 oriented substantially perpendicular to the cylinder axis or housing axis and having concavely curved inner end wall surfaces.

Each of the two half-shells 14a, 14b has a passage 18a, 18b. The first passage 18a arranged in the first half-shell 14a is positioned in the housing mantle 142, while the second passage 18b arranged in the second half-shell 14b is positioned in the end wall 143 belonging to the second half-shell 14b. Both passages 18a, 18b are positioned in their respective associated housing wall in close proximity to the respectively other type of housing wall. This means that the first passage 18a, which is arranged in the mantle 142, is positioned close to the end wall 143 associated with the first half-shell 14a, while the second passage 18b, which is arranged in end wall 143 associated with the second half-shell 14b, is positioned close to the mantle 142. The 90° curved main tube 12 therefore passes through the inner space 141 along the longest possible path in the case of a simple curvature.

The figures clearly show wall thickenings 20 which each half-shell 14a, 14b carries in the mantle and end wall region in which one of the passages 18a, 18b is formed in at least one of the half-shells 14a, 14b. According to a particularly advantageous manufacturing process, both half-shells 18a, 18b are manufactured with the same tool, in particular a deep-drawing tool, and therefore initially are identical in shape. The passages 18a, 18b distinguishing the two half-shells 14a, 14b were introduced subsequently by machining, in particular by means of drilling.

FIG. 3 clearly shows four windows 22, via which the interior space 141 is in fluid-conducting communication with the interior of the main tube 12. In this way, a so-called Helmholtz resonator is realized with the sound reducer 10, and the interior space 141 acts as a resonance chamber.

FIGS. 1 to 3 do not show the sound reducer 10 alone; also shown are the ends of connecting tubes 24 that are inserted from the outside into the passages 18a, 18b and butt-welded to the ends 121, 122 of the main tube 12 (and thereby additionally to the housing 14, in particular to the edges of the passages 18a, 18b).

FIGS. 4a-4d show an alternative embodiment of a sound reducer 10 according to the invention, in which the ends 121, 122 of the main tube 12 project through the passages 18a, 18b. The connecting tubes 20 are fit onto the ends 121, 122 projecting beyond the housing wall and welded thereto. FIGS. 4a-4d, however, serve primarily to illustrate an arrangement of the windows 22, which is considered advantageous for all embodiments of the sound reducer 10. The windows 22 penetrate the wall of the main tube vertically and are axially elongated in its main plane. This means that they are positioned on the—with respect to the main tube curvature—radially inner and radially outer apex lines. However, they are offset from each other in the direction of extension of the main tube 12. In particular, each of the four windows 22 shown is located in the immediate vicinity of the housing wall nearest to it. It follows that, as illustrated in FIGS. 4a-4d, whenever the sound reducer 10 is aligned with a vertical leg of its main tube, one of the windows 22 (circled in bold in each of the figures) is located at the lowest point of the main tube 12 is arranged in the housing 14. Accordingly, the suction by Bernoulli effect discussed in the general description occurs even at very low levels of liquid accumulated in the interior space 141.

Figure 5:
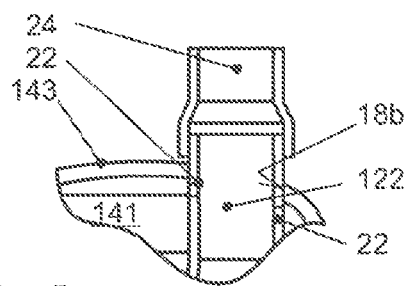
FIG. 5 is a detailed view of the connection point of a sound reducer according to the invention with the connection tube attached.
Figure 6:
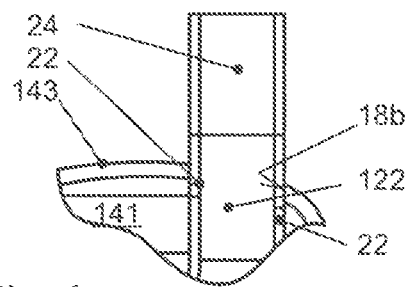
FIG. 6 is a detailed representation of the connection point of a sound reducer according to the invention with a butt-welded connection tube.
Figure 7:
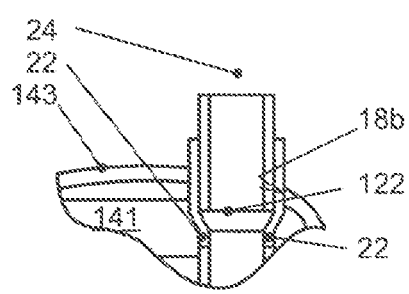
FIG. 7 is a detailed view of the connection point of a sound reducer according to the invention with the connection tube inserted.
Figure 8:
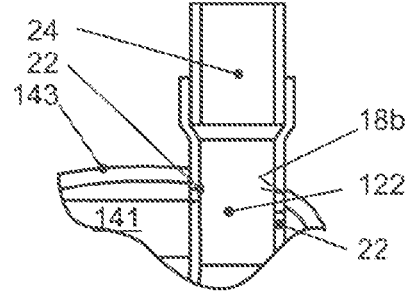
FIG. 8 is a detailed view of the connection point of a sound reducer according to the invention with the connection tube inserted.

FIGS. 5 to 8 show various ways of connecting a connecting tube 24 to an end 122 of the main tube 12. In FIG. 5, the connecting tube 24 is butt-welded to the main tube end 122, the end of the connecting tube 24 having an enlarged diameter to avoid a diameter jump inside the connected tubes. FIG. 6 shows a butt weld of the connecting tube 24 onto the main tube end 122, but the main tube 122 protrudes from the housing 14, in contrast to the embodiment of FIGS. 1 to 3. In FIGS. 7 and 8, the connecting tube 20 is inserted into a diameter-expanded main tube end 122, the diameter expansion starting in the interior space 141 in the embodiment of FIG. 7, whereas in the embodiment of FIG. 8 it only starts outside the housing 14.

Figure 9:
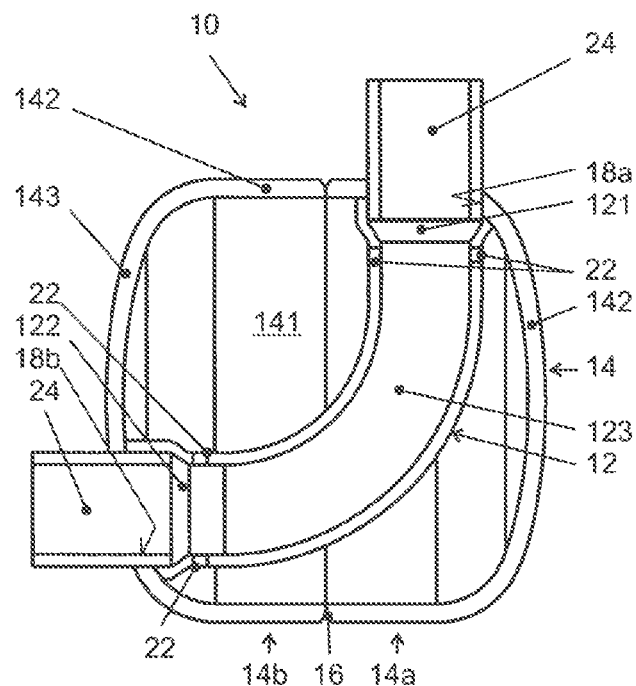
FIG. 9 is a section through a further embodiment of a sound reducer according to the invention.
Figure 10:
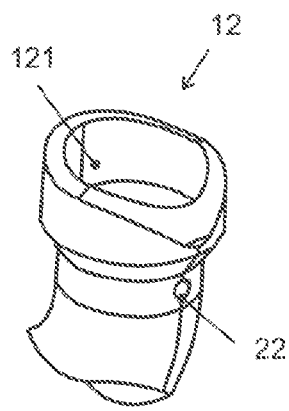
FIG. 10 is a perspective view of one end of the main tube of the sound reducer of FIG. 9.

FIGS. 9 and 10 illustrate an embodiment where the ends 121, 122 of the main tube 12 do not project into or even through the passages 18a, 18b. Rather, as can be seen in particular in FIG. 10, the end ring surface of the main tube ends 121, 122 is corrugated in such a way that it nestles exactly around the associated passage 18a, 18b against the mantle and associated end wall inner surface. In this regard, there is only one exact position and orientation of the main tube 12 in which it fits within the housing 14. In this position and orientation, the main tube 12 as a whole is positively held by the two half-shells 14a, 14b.

Of course, the embodiments discussed in the specific description and shown in the figures are only illustrative examples of embodiments of the present invention. The skilled person is provided with a wide range of possible variations in light of the present disclosure. In particular, the relative dimensions of the main tube 12 and the housing 14, as well as the positioning, shaping and dimensioning of the windows 22 and the interior space 141, are open to variations and adjustments resulting in particular from the acoustic requirements in each individual case. Typically, windows in the form of round through openings (holes) or slots are used; however, polygonal or linear (straight or curved) windows can also be used in the context of the invention. With regard to the choice of material, metal is preferred, although embodiments made of plastic are also conceivable.

LIST OF REFERENCE SIGNS 10 sound reducer
12 main tube
121 first end of 12
122 second end of 12
123 central area of 12
14 housing
14a first half-shell of 14
14a second half-shell of 14
141 interior space of 14
142 mantle of 14
143 end wall of 14
16 connection line
18a first passage
18b second passage 20 wall thickening
22 windows
24 connection tube

The invention claimed is:

1. A sound reducer (10), comprising:
   a housing (14) with an interior space (141) and a housing wall bounding the interior space (141), the housing wall comprising a mantle (142) extending longitudinally along a housing axis with a mantle inner surface rotationally symmetrical about the housing axis and two end walls (143) aligned transverse to the housing axis, each of the end walls defining an associated end wall inner surface, and
   a continuous main tube (12) extending through the interior space (141) and having a first end (121), a second end (122), and windows (22) formed as tube wall openings within the interior space (141), the first end (121) of the main tube (12) being fixed in or at a first passage (18*a*) passing through the housing wall and the second end (122) of the main tube (12) being fixed in or at a second passage (18*b*) passing through the housing wall, with at least the second passage (18*b*) passing eccentrically through one of the end walls (143), wherein
   the housing (14) consists of first and second interconnected axial half-shells (14*a*, 14*b*), the first passage (18*a*) being formed in the first axial half-shell (14*a*) and the second passage (18*b*) being formed in the second axial half-shell (14*b*), the first and second axial half-shells (14*a*, 14*b*) being shaped identically except for positions of the first and second passages (18*a*, 18*b*); and
   the main tube (12) is curved in a main plane and the first passage (18*a*) passes through the mantle (142).

2. The sound reducer (10) of claim 1, wherein the housing axis lies in the main plane of the main tube (12) and the centers of the passages (18*a*, 18*b*) lie on different sides of the housing axis.

3. The sound reducer (10) of claim 1, wherein axial directions of the first and second ends (121, 122) of the main tube (12) are perpendicular to each other.

4. The sound reducer (10) of claim 3, wherein a plurality of the windows (22) are arranged on radially outer and radially inner apex lines of the main tube (12), in each case in relation to the curvature of the main tube (12), and adjacent to the passages (18*a*, 18*b*) and offset from one another in such a way that in each orientation of the sound reducer (10) with vertical alignment of one of its main tube ends (121, 122) one of the windows (22) is positioned at a lowest point of the main tube (12) within the interior space (141).

5. The sound reducer (10) of claim 1, wherein the ends (121, 122) of the main tube (12) engage positively in the passages (18*a*, 18*b*).

6. The sound reducer (10) of claim 5, wherein the ends (121, 122) of the main tube (12) project through the passages (18*a*, 18*b*).

7. The sound reducer (10) of claim 1, wherein the main tube (12) is fit positively into a contour of the interior space (141) so that edges of the first and second ends (121, 122) lie flush against the edges of the passages (18*a*, 18*b*).

8. The sound reducer (10) of claim 7, wherein the edges of the first and second ends (121, 122) of the main tube (12) are corrugated for form-fit adaptation to curvatures of the inner surfaces of the mantle and end walls (142, 143).

9. The sound reducer (10) of claim 8, wherein areas of the main tube (12) between the first and second ends (121, 122) pass through the interior space (141) otherwise without contact.

10. The sound reducer (10) of claim 1, wherein the first and second half-shells (14*a*, 14*b*) have local wall thickenings (20) in regions of the mantle of the first half-shell (14*a*) having the first passage (18*a*) and in regions of the end wall of the second half-shell (14*b*) having the second passage (18*b*), the respective passage (18*a*, 18*b*) passing through the wall thickenings.

11. A fluid conduit system comprising the sound reducer (10) of claim 1 through which a gaseous fluid can flow, and connecting tubes (24) fluid-tightly connected to the ends of the main tube (12) of the sound reducer (10).

12. The fluid conduit system of claim 11, wherein the connecting tubes (24) are inserted into the ends (121, 122) of the main tube (12).

13. The fluid conduit system of claim 11, wherein the connecting tubes (24) are butt welded to the ends (121, 122) of the main tube (12).

14. The fluid conduit system of claim 11, wherein the connecting tubes (24) are plugged onto the ends (121, 122) of the main tube (12).

15. The fluid conduit system of claim 11, designed as a refrigerant circuit of a motor vehicle air conditioning system.

16. A sound reducer (10), comprising:
   a housing (14) formed by first and second axial half-shells (14*a*, 14*b*), the first axial half-shell (14*a*) having a first end wall (143) and a first side wall extending from the first end wall (143), the second axial half-shell (14*b*) having a second end wall (143) and a second side wall extending from the second end wall (143), ends of the first and second side walls remote from the respective first and second end walls (143) being connected to one another so that the first and second side walls form a mantle (142) extending between the first and second end walls (143) and defining a single interior space (141) inward of the first and second axial half-shells (14*a*, 14*b*), a first passage (18*a*) passing through a portion of the mantle (142) formed by the first axial half-shell (14*a*) and adjacent the first end wall (143), and a second passage (18*b*) passing eccentrically through the second end wall (143) at a position adjacent the mantle (143); and
   a main tube (12) extending through the interior space (141) and having a first end (121), a second end (122), and windows (22) formed as tube wall openings within the interior space (141), the main tube (12) being curved in a main plane so that the first end (121) of the main tube (12) is fixed in or at the first passage (18*a*) passing through the mantle (142) and the second end (122) of the main tube (12) is fixed in or at the second passage (18*b*) passing through the second end wall (143), wherein
   the first and second axial half-shells (14*a*, 14*b*) are shaped identically except for relative positions of the first and second passages (18*a*, 18*b*).

17. A sound reducer (10), composing:
   a housing (14) formed by first and second axial half-shells (14*a*, 14*b*), the first axial half-shell (14*a*) having a first end wall (143) and a first side wall extending from the first end wall (143), the second axial half-shell (14*b*) having a second end wall (143) and a second side wall extending from the second end wall (143), ends of the first and second side walls remote from the respective first and second end walls (143) being connected to one another so that the first and second side walls form a mantle (142) extending between the first and second end walls (143) and defining a single interior space (141) inward of the first and second axial half-shells (14*a*, 14*b*), a first passage (18*a*) passing through a portion of the mantle (142) formed by the first axial hall-shell (14*a*), and a second passage (18*b*) passing eccentrically through the second end wall (143); and a main tube (12) extending through the interior space (141) and having a first end (121), a second end (122), and windows (22) formed as tube wall openings within the interior space (141), the main tube (12) being curved in a main plane so that the first end (121) of the main tube (12) is fixed in or at the first passage (18*a*) passing through the mantle (142) a d the second end (122) of the main tube (12) is fixed in or at the second passage (18*b*) passing through the second end wall (143), wherein the first and second axial half-shells (14*a*, 14*b*) are shaped identically except for relative positions of the first and se s (18*a*, 18*b*), and the second passage (18*b*) is adjacent a longitudinal side of the mantle (142) opposite a longitudinal side of the mantle (142) through which the first passage (18*a*) extends.

18. The sound reducer (10) of claim 17, wherein one of the first passage (18*a*) and the second passage (18*b*) is disposed adjacent a gravitational bottom of the sound reducer (10).

19. The sound reducer (10) of claim 18, wherein at least one of the windows (22) in the main tube (12) opens toward the gravitational bottom of the sound reducer (10).

\* \* \* \* \*